US011226395B2

(12) United States Patent
Hill et al.

(10) Patent No.: US 11,226,395 B2
(45) Date of Patent: *Jan. 18, 2022

(54) TRACKING SYSTEM WITH MOBILE READER

(71) Applicant: Position Imaging, Inc., Portsmouth, NH (US)

(72) Inventors: Edward L. Hill, Conway, NH (US); Harry Lee Deffebach, III, Melbourne Beach, FL (US)

(73) Assignee: POSITION IMAGING, INC., Portsmouth, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/857,342

(22) Filed: Apr. 24, 2020

(65) Prior Publication Data
US 2021/0011114 A1 Jan. 14, 2021

Related U.S. Application Data

(60) Continuation of application No. 15/291,304, filed on Oct. 12, 2016, now Pat. No. 10,634,762, which is a (Continued)

(51) Int. Cl.
*G01S 11/10* (2006.01)
*G01S 5/06* (2006.01)
(Continued)

(52) U.S. Cl.
CPC .................... *G01S 5/06* (2013.01); *G01S 5/02* (2013.01); *G01S 5/0221* (2013.01);
(Continued)

(58) Field of Classification Search
CPC .......... G01S 5/06; G01S 11/16; G01S 5/0081; G01S 5/18; G01S 5/30; G01S 11/10;
(Continued)

(56) References Cited

U.S. PATENT DOCUMENTS 2,408,122 A 9/1946 Wirkler
3,824,596 A 7/1974 Guion et al.
(Continued)

FOREIGN PATENT DOCUMENTS

| WO | 2001006401 A1 | 1/2001 |
| WO | 2005010550 A1 | 2/2005 |
| WO | 2009007198 A1 | 1/2009 |

OTHER PUBLICATIONS

Morbella N50: 5-inch GPS Navigator User's Manual, Maka Technologies Group, May 2012.
(Continued)

*Primary Examiner* — Dionne Pendleton
(74) *Attorney, Agent, or Firm* — Schmeiser, Olsen & Watts LLP

(57) ABSTRACT

A tracking system uses a mobile reader or scanner that scans, for example through a barcode reader, a passive tag reader, a probe, input, camera, or an active RF tag communication reader, and records item (asset or inventory) data. After being recorded, this item data and other relevant data is sent by radio transmission to a receiver network in the tracking system. The receiver network has at least two receivers (or at least two receiver antennae). The scanner location data, calculated by comparing the signal information at each receiver antenna receiving the radio transmission, is then used to register and record the location data of the scanned item.

23 Claims, 5 Drawing Sheets

Related U.S. Application Data division of application No. 14/568,468, filed on Dec. 12, 2014, now Pat. No. 10,634,761, application No. 16/857,342, which is a continuation of application No. 14/568,468, filed on Dec. 12, 2014, now Pat. No. 10,634,761.

(60) Provisional application No. 61/915,647, filed on Dec. 13, 2013.

(51) Int. Cl.

| | | |
|---|---|---|
| *G06Q 30/06* | (2012.01) | |
| *G01S 5/02* | (2010.01) | |
| *G08B 13/24* | (2006.01) | |
| *H04W 4/80* | (2018.01) | |
| *G06Q 10/08* | (2012.01) | |
| *H04W 4/029* | (2018.01) | |
| *G06K 7/10* | (2006.01) | |
| *G06K 17/00* | (2006.01) | |

(52) U.S. Cl.
CPC .......... *G01S 5/0268* (2013.01); *G01S 5/0294* (2013.01); *G06K 7/10* (2013.01); *G06K 7/10366* (2013.01); *G06K 7/10376* (2013.01); *G06K 17/0029* (2013.01); *G06Q 10/08* (2013.01); *G06Q 30/0639* (2013.01); *G08B 13/2462* (2013.01); *H04W 4/029* (2018.02); *H04W 4/80* (2018.02)

(58) Field of Classification Search
CPC ........ G01S 5/08; G01S 13/003; G01S 13/325; G01S 13/726; G01S 19/42; G01S 1/08; G01S 2013/462; G01S 3/48; G01S 3/74; G01S 5/0027; G01S 5/0036; G01S 5/0221; G01S 5/0226; G01S 5/0252; G01S 5/0257; G01S 5/0294; G01S 5/10; G01S 5/14; G01S 5/26; G01S 7/354; G01S 13/767; G01S 5/0289; G01S 13/878; G01S 19/11; G01S 19/14; G01S 19/215; G01S 19/23; G01S 19/246; G01S 19/37; G01S 19/46; G01S 19/48; G01S 1/024; G01S 1/24; G01S 5/021; G01S 5/0268; G01S 5/12; E04D 13/0765; G01B 21/00; G06F 17/3087; G06F 17/30985; G06F 17/30247; G06F 17/30265; G06F 19/00; G06F 19/3481; G06F 19/3406; G06F 16/00; G06F 16/58; G06F 16/583; G06F 16/9537; H04W 84/18; H04W 4/02; H04W 64/003; H04W 12/08; H04W 48/04; H04W 4/008; H04W 4/021; H04W 4/025; H04W 64/00; H04W 8/02; H04W 4/029; H04W 4/80; H04W 12/00502; H04W 12/00503; H04W 4/023; H04W 4/04; H04W 4/33; Y10S 706/916; Y10T 403/32368; Y10T 403/32581; G05B 15/02; G06K 19/06028; G06K 19/07758; G06K 7/1413; G06K 7/0008; G06K 7/10366; G06K 17/00; G06K 19/0716; G06K 19/0717; G06K 19/0723; G06K 19/077; G06K 19/07749; G06K 19/07773; G06K 7/10009; G06K 7/10178; G06K 7/10297; G07G 1/0045; G07G 1/009; G16H 40/63; H04B 5/0031; H04B 17/27; H04B 7/0697; H04B 7/086; H04B 7/0888; H04B 1/69; A47C 27/083; A47C 31/123; A61B 2562/0247; A61B 2562/028; A61B 5/0022; A61B 5/0024; A61B 5/447; A61B 5/6832; A61B 5/7275; A61G 2203/34; F04C 2270/041; G08B 13/2462; G06Q 30/06; G06Q 30/0623; G06Q 30/0639; G06Q 30/0643; G06Q 10/087; G06Q 10/08; G06Q 20/208; G06Q 20/327; G06Q 20/3276; G06Q 20/3278; G06Q 30/02; G06Q 30/0238; G06Q 30/0253; G06Q 10/0833; A61F 13/42; A61F 13/84; A61F 2013/424; A61F 2013/8473; A61F 2013/8479; A61F 2013/8482; G01D 11/305; G01D 1/14; G01D 9/005; G01K 1/024; G01K 3/04; G01N 27/126; G01N 33/48792; G01V 15/00; H01Q 1/2225; H01Q 1/24; H01Q 7/00; H01Q 9/16; H04L 43/106; H04L 63/0492; H04L 63/08; H04L 63/10

See application file for complete search history.

(56) References Cited

U.S. PATENT DOCUMENTS

| | | |
|---|---|---|
| 3,940,700 A | 2/1976 | Fischer |
| 4,328,499 A | 5/1982 | Anderson et al. |
| 5,010,343 A | 4/1991 | Andersson |
| 5,343,212 A | 8/1994 | Rose et al. |
| 5,426,438 A | 6/1995 | Peavey et al. |
| 5,510,800 A | 4/1996 | McEwan |
| 5,574,468 A | 11/1996 | Rose |
| 5,592,180 A | 1/1997 | Yokev et al. |
| 5,600,330 A | 2/1997 | Blood |
| 5,657,026 A | 8/1997 | Culpepper et al. |
| 5,923,286 A | 7/1999 | Divakaruni |
| 5,953,683 A | 9/1999 | Hansen et al. |
| 6,088,653 A | 7/2000 | Sheikh et al. |
| 6,101,178 A | 8/2000 | Beal |
| 6,167,347 A | 12/2000 | Lin |
| 6,255,991 B1 | 7/2001 | Hedin |
| 6,292,750 B1 | 9/2001 | Lin |
| 6,409,687 B1 | 6/2002 | Foxlin |
| 6,412,748 B1 | 7/2002 | Girard |
| 6,417,802 B1 | 7/2002 | Diesel |
| 6,496,778 B1 | 12/2002 | Lin |
| 6,512,748 B1 | 1/2003 | Mizuki et al. |
| 6,593,885 B2 | 7/2003 | Wisherd et al. |
| 6,630,904 B2 | 10/2003 | Gustafson et al. |
| 6,683,568 B1 | 1/2004 | James et al. |
| 6,697,736 B2 | 2/2004 | Lin |
| 6,720,920 B2 | 4/2004 | Breed et al. |
| 6,721,657 B2 | 4/2004 | Ford et al. |
| 6,744,436 B1 | 6/2004 | Chirieleison et al. |
| 6,750,816 B1 | 6/2004 | Kunysz |
| 6,861,982 B2 | 3/2005 | Forstrom et al. |
| 6,867,774 B1 | 3/2005 | Halmshaw et al. |
| 6,989,789 B2 | 1/2006 | Ferreol et al. |
| 7,009,561 B2 | 3/2006 | Menache et al. |
| 7,143,004 B2 | 11/2006 | Townsend et al. |
| 7,168,618 B2 | 1/2007 | Schwartz |
| 7,190,309 B2 | 3/2007 | Hill |
| 7,193,559 B2 | 3/2007 | Ford et al. |
| 7,236,091 B2 | 6/2007 | Kiang et al. |
| 7,292,189 B2 | 11/2007 | Orr et al. |
| 7,295,925 B2 | 11/2007 | Breed et al. |
| 7,315,281 B2 | 1/2008 | Dejanovic et al. |
| 7,336,078 B1 | 2/2008 | Merewether et al. |
| 7,409,290 B2 | 8/2008 | Lin |
| 7,443,342 B2 | 10/2008 | Shirai et al. |
| 7,499,711 B2 | 3/2009 | Hector et al. |
| 7,533,569 B2 | 5/2009 | Sheynblat |
| 7,612,715 B2 | 11/2009 | Macleod |
| 7,646,330 B2 | 1/2010 | Karr |
| 7,868,760 B2 | 1/2011 | Smith et al. |
| 7,876,268 B2 | 1/2011 | Jacobs |
| 7,933,730 B2 | 4/2011 | Li et al. |

(56) References Cited

U.S. PATENT DOCUMENTS

| | | | |
|---|---|---|---|
| 8,269,624 B2 | 9/2012 | Chen et al. |
| 8,457,655 B2 | 6/2013 | Zhang et al. |
| 8,749,433 B2 | 6/2014 | Hill |
| 8,860,611 B1 | 10/2014 | Anderson et al. |
| 8,957,812 B1 | 2/2015 | Hill et al. |
| 9,063,215 B2 | 6/2015 | Perthold et al. |
| 9,092,898 B1 | 7/2015 | Fraccaroli et al. |
| 9,141,194 B1 | 9/2015 | Keyes et al. |
| 9,174,746 B1 | 11/2015 | Bell et al. |
| 9,482,741 B1 | 11/2016 | Min et al. |
| 9,497,728 B2 | 11/2016 | Hill |
| 9,519,344 B1 | 12/2016 | Hill |
| 9,782,669 B1 | 10/2017 | Hill |
| 9,872,151 B1 | 1/2018 | Puzanov et al. |
| 9,933,509 B2 | 4/2018 | Hill et al. |
| 9,961,503 B2 | 5/2018 | Hill |
| 10,001,833 B2 | 6/2018 | Hill |
| 10,180,490 B1 | 1/2019 | Schneider et al. |
| 10,257,654 B2 | 4/2019 | Hill |
| 10,416,276 B2 | 9/2019 | Hill et al. |
| 10,634,762 B2* | 4/2020 | Hill | H04W 4/02 |
| 2002/0021277 A1 | 2/2002 | Kramer et al. |
| 2002/0140745 A1 | 10/2002 | Ellenby et al. |
| 2002/0177476 A1 | 11/2002 | Chou |
| 2003/0053492 A1 | 3/2003 | Matsunaga |
| 2003/0120425 A1 | 6/2003 | Stanley et al. |
| 2003/0176196 A1 | 9/2003 | Hall et al. |
| 2003/0195017 A1 | 10/2003 | Chen et al. |
| 2004/0095907 A1 | 5/2004 | Agee et al. |
| 2004/0107072 A1 | 6/2004 | Dietrich et al. |
| 2004/0176102 A1 | 9/2004 | Lawrence et al. |
| 2004/0203846 A1 | 10/2004 | Caronni et al. |
| 2005/0001712 A1 | 1/2005 | Yarbrough |
| 2005/0057647 A1 | 3/2005 | Nowak |
| 2005/0143916 A1 | 6/2005 | Kim et al. |
| 2005/0184907 A1 | 8/2005 | Hall et al. |
| 2005/0275626 A1 | 12/2005 | Mueller et al. |
| 2006/0013070 A1 | 1/2006 | Holm et al. |
| 2006/0022800 A1* | 2/2006 | Krishna | G06K 17/0029 |
| | | | 340/10.2 |
| 2006/0061469 A1 | 3/2006 | Jaeger et al. |
| 2006/0066485 A1 | 3/2006 | Min |
| 2006/0101497 A1 | 5/2006 | Hirt et al. |
| 2006/0192709 A1 | 8/2006 | Schantz et al. |
| 2006/0279459 A1 | 12/2006 | Akiyama et al. |
| 2006/0290508 A1 | 12/2006 | Moutchkaev et al. |
| 2007/0060384 A1 | 3/2007 | Dohta |
| 2007/0138270 A1 | 6/2007 | Reblin |
| 2007/0205867 A1 | 9/2007 | Kennedy et al. |
| 2007/0210920 A1 | 9/2007 | Panotopoulos |
| 2007/0222560 A1 | 9/2007 | Posamentier |
| 2008/0007398 A1 | 1/2008 | DeRose et al. |
| 2008/0048913 A1 | 2/2008 | Macias et al. |
| 2008/0143482 A1 | 6/2008 | Shoarinejad et al. |
| 2008/0150678 A1 | 6/2008 | Giobbi et al. |
| 2008/0154691 A1 | 6/2008 | Wellman et al. |
| 2008/0174485 A1 | 7/2008 | Carani et al. |
| 2008/0204322 A1 | 8/2008 | Oswald et al. |
| 2008/0266253 A1 | 10/2008 | Seeman et al. |
| 2008/0281108 A1 | 11/2008 | Mermet et al. |
| 2008/0316324 A1 | 12/2008 | Rofougaran et al. |
| 2009/0043504 A1 | 2/2009 | Bandyopadhyay et al. |
| 2009/0149202 A1 | 6/2009 | Hill et al. |
| 2009/0224040 A1* | 9/2009 | Kushida | G06Q 10/08 |
| | | | 235/385 |
| 2009/0243932 A1 | 10/2009 | Moshfeghi |
| 2009/0323586 A1 | 12/2009 | Hohl et al. |
| 2010/0090852 A1 | 4/2010 | Eitan et al. |
| 2010/0097208 A1 | 4/2010 | Rosing et al. |
| 2010/0103173 A1 | 4/2010 | Lee et al. |
| 2010/0103989 A1 | 4/2010 | Smith et al. |
| 2010/0123664 A1 | 5/2010 | Shin et al. |
| 2010/0159958 A1 | 6/2010 | Naguib et al. |
| 2010/0271187 A1* | 10/2010 | Uysal | G06K 7/10009 |
| | | | 340/10.4 |
| 2011/0006774 A1 | 1/2011 | Baiden |
| 2011/0037573 A1 | 2/2011 | Choi |
| 2011/0187600 A1 | 8/2011 | Landt |
| 2011/0208481 A1 | 8/2011 | Slastion |
| 2011/0210843 A1 | 9/2011 | Kummetz |
| 2011/0241942 A1 | 10/2011 | Hill |
| 2011/0256882 A1 | 10/2011 | Markhovsky et al. |
| 2011/0264520 A1 | 10/2011 | Puhakka |
| 2012/0013509 A1* | 1/2012 | Wisherd | G01S 5/06 |
| | | | 342/451 |
| 2012/0127088 A1 | 5/2012 | Pance et al. |
| 2012/0176227 A1 | 7/2012 | Nikitin |
| 2012/0184285 A1 | 7/2012 | Sampath et al. |
| 2012/0286933 A1 | 11/2012 | Hsiao |
| 2012/0319822 A1 | 12/2012 | Hansen |
| 2013/0018582 A1 | 1/2013 | Miller et al. |
| 2013/0021417 A1 | 1/2013 | Ota et al. |
| 2013/0029685 A1 | 1/2013 | Moshfeghi |
| 2013/0036043 A1* | 2/2013 | Faith | G06Q 30/0643 |
| | | | 705/39 |
| 2013/0113993 A1 | 5/2013 | Dagit, III |
| 2013/0281084 A1 | 10/2013 | Batada et al. |
| 2013/0314210 A1 | 11/2013 | Schoner et al. |
| 2014/0022058 A1 | 1/2014 | Striemer et al. |
| 2014/0253368 A1 | 9/2014 | Holder |
| 2014/0277854 A1* | 9/2014 | Jones | G06Q 30/0261 |
| | | | 701/3 |
| 2014/0300516 A1 | 10/2014 | Min et al. |
| 2014/0361078 A1 | 12/2014 | Davidson |
| 2015/0009949 A1 | 1/2015 | Khoryaev et al. |
| 2015/0039458 A1 | 2/2015 | Reid |
| 2015/0091757 A1 | 4/2015 | Shaw et al. |
| 2015/0133162 A1 | 5/2015 | Meredith et al. |
| 2015/0134418 A1 | 5/2015 | Leow et al. |
| 2015/0169916 A1 | 6/2015 | Hill et al. |
| 2015/0323643 A1 | 11/2015 | Hill et al. |
| 2015/0362581 A1 | 12/2015 | Friedman et al. |
| 2015/0379366 A1 | 12/2015 | Nomura et al. |
| 2016/0142868 A1 | 5/2016 | Kulkarni et al. |
| 2016/0150196 A1 | 5/2016 | Horvath |
| 2016/0156409 A1 | 6/2016 | Chang |
| 2016/0178727 A1 | 6/2016 | Bottazzi |
| 2016/0256100 A1 | 9/2016 | Jacofsky et al. |
| 2016/0286508 A1 | 9/2016 | Khoryaev et al. |
| 2016/0370453 A1 | 12/2016 | Boker et al. |
| 2016/0371574 A1 | 12/2016 | Nguyen et al. |
| 2017/0031432 A1 | 2/2017 | Hill |
| 2017/0234979 A1* | 8/2017 | Mathews | G01S 1/08 |
| | | | 342/357.64 |
| 2017/0280281 A1 | 9/2017 | Pandey et al. |
| 2017/0372524 A1 | 12/2017 | Hill |
| 2019/0090744 A1 | 3/2019 | Mahfouz |
| 2020/0011961 A1 | 1/2020 | Hill et al. |

OTHER PUBLICATIONS

Non-Final Office Action in U.S. Appl. No. 14/568,468 dated Jul. 9, 2019; 14 pages.

Dictionary Definition for Peripheral Equipment. (2001). Hargrave's Communications Dictionary, Wiley. Hoboken, NJ: Wiley. Retrieved from Https://search.credorefernce.com/content/entry/hargravecomms/peripheral_equioment/0 (Year:2001).

Notice of Allowance in U.S. Appl. No. 14/568,468, dated Feb. 14, 2020; 9 pages.

Debo Sun, "Ultra-Tight GPS/Reduced IMU for Land Vehicle Navigation", Mar. 2010, UCGE Reports No. 20305.

Farrell & Barth, "The Global Positioning System & Interial Navigation", 1999, McGraw-Hill; pp. 245-252.

Goodall, Christopher L., "Improving Usability of Low-Cost INS/GPS Navigation Systems using Intelligent Techniques", Jan. 2009, UCGE Reports No. 20276.

Grewal & Andrews, "Global Positioning Systems, Inertial Nagivation, and Integration", 2001, John Weiley and Sons, pp. 252-256.

Jianchen Gao, "Development of a Precise GPS/INS/On-Board Vehicle Sensors Integrated Vehicular Positioning System", Jun. 2007, UCGE Reports No. 20555.

(56) References Cited

OTHER PUBLICATIONS

Yong Yang, "Tightly Coupled MEMS INS/GPS Integration with INS Aided Receiver Tracking Loops", Jun. 2008, UCGE Reports No. 20270.
Adrian Schumacher, "Integration of a GPS aised Strapdown Inertial Navigation System for Land Vehicles", Master of Science Thesis, KTH Electrical Engineering, 2006.
Jennifer Denise Gautier, "GPS/INS Generalized Evaluation Tool (GIGET) for the Design and Testing of Integrated Navigation Systems", Dissertation, Stanford University, Jun. 2003.
Schmidt & Phillips, "INS/GPS Integration Architectures", NATO RTO Lecture Seriers, First Presented Oct. 20-21, 2003.
Sun, et al., "Analysis of the Kalman Filter With Different INS Error Models for GPS/INS Integration in Aerial Remote Sensing Applications", Bejing, 2008, The International Archives of the Photogrammerty, Remote Sensing and Spatial Information Sciences vol. XXXVII, Part B5.
Pourhomayoun, Mohammad and Mark Fowler, "Improving WLAN-based Indoor Mobile Positioning Using Sparsity," Conference Record of the Forty Sixth Asilomar Conference on Signals, Systems and Computers, Nov. 4-7, 2012, pp. 1393-1396, Pacific Grove, California.
Notice of Allowance in U.S. Appl. No. 15/291,304 dated Sep. 27, 2018; 10 pages.
Non-Final Office Action in U.S. Appl. No. 15/291,304 dated Mar. 29, 2017; 14 pages.
Non-Final Office Action in U.S. Appl. No. 14/568,468 dated Jan. 11, 2018; 12 pages.
Notice of Allowance in U.S. Appl. No. 14/568,468 dated Sep. 18, 2017; 10 pages.
Non-Final Office Action in U.S. Appl. No. 14/568,468 dated Jan. 30, 2017; 12 pages.
Non-Final Office Action in U.S. Appl. No. 14/568,468 dated Aug. 10, 2016; 9 pages.
Vikas Numar N., "Integration of Inertial Navigation System and Global Positioning System Using Kalman Filtering", M.Tech Dissertation, Indian Institute of Technology, Bombay, Mumbai, Jul. 2004.
Farrell, et al., "Real-Time Differential Carrier Phase GPS=Aided INS", Jul. 2000, IEEE Transactions on Control Systems Technology, vol. 8, No. 4.
"ADXL202/ADXL210 Product Sheet," Analog.com, 1999.
Proakis, John G. and Masoud Salehi, "Communication Systems Engineering", Second Edition, Prentice-Hall, Inc., Upper Saddle River, New Jersey, 2002.
Wilde, Andreas, "Extended Tracking Range Delay-Locked Loop," Proceedings IEEE International Conference on Communications, Jun. 1995, pp. 1051-1054.
Li, et al. "Multifrequency-Based Range Estimation of RFID Tags," IEEE International Conference on RFID, 2009.
Welch, Greg and Gary Bishop, "An Introduction to the Kalman Filter," Department of Computer Science, University of North Carolina at Chapel Hill, Chapel Hill, NC 27599-3175, Updated: Monday, Jul. 24, 2006.
Filho, et al., "Integrated GPS/INS Navigation System Based on a Gyrpscope-Free IMU", DINCON Brazilian Conference on Synamics, Control, and Their Applications, May 22-26, 2006.
Santiago Alban, "Design and Performance of a Robust GPS/INS Attitude System for Automobile Applications", Dissertation, Stanford University, Jun. 2004.
International Search Report & Written Opinion in international patent application PCT/US12/64860, dated Feb. 28, 2013; 8 pages.
Non-Final Office Action in U.S. Appl. No. 14/568,468 dated Jan. 7, 2019; 11 pages.
Notice of Allowance in U.S. Appl. No. 14/568,468 dated Aug. 3, 2018; 10 pages.
Notice of Allowance in U.S. Appl. No. 15/291,304 dated Mar. 16, 2020; 10 pages.
Final Office Action in U.S. Appl. No. 15/291,304 dated Jun. 19, 2019; 14 pages.
Final Office Action in U.S. Appl. No. 15/291,304 dated Dec. 20, 2018; 13 pages.
Final Office Action in U.S. Appl. No. 15/291,304 dated May 31, 2018; 15 pages.
Non-Final Office Action in U.S. Appl. No. 15/291,304 dated Oct. 19, 2017; 14 pages.

\* cited by examiner

TRACKING SYSTEM WITH MOBILE READER

RELATED APPLICATIONS

This application claims the benefit of and priority to U.S. patent application Ser. No. 15/291,304, filed Oct. 12, 2016, titled "Tracking System with Mobile Reader," which is a division application of the U.S. patent application Ser. No. 14/568,468, filed Dec. 12, 2014, titled "Tracking System with Mobile Reader," which claims priority from U.S. provisional application No. 61/915,647, filed Dec. 13, 2013, titled "Tracking System with Mobile Scanner." This application also claims the benefit of and priority to U.S. patent application Ser. No. 14/568,468, filed Dec. 12, 2014, titled "Tracking System with Mobile Reader," which claims priority from U.S. provisional application No. 61/915,647, filed Dec. 13, 2013, titled "Tracking System with Mobile Scanner." The entireties of these U.S. patent applications and provisional application are incorporated by reference herein.

FIELD OF THE INVENTION

The invention relates generally to systems and methods for determining the position of an electromagnetic signal transmitting device, in particular, the position of a mobile reader with such a transmitter.

BACKGROUND

Commercial organizations are becoming increasingly complex, and industry is seeking techniques for tracking the location and use of inventory and assets with increasing specificity. Accordingly, many industries are deploying asset tracking systems that include electronically readable identification tags. Conventionally, assets are bar-coded and manually scanned. Other techniques involve placing passive radio frequency identification (RFID) tags placed on the front of assets, which can be read RFID readers.

SUMMARY

Systems and methods described herein using a combination of a handheld (or mobile) ID reader (or scanner) and a master radio-based scanner location tracking system to track uniquely identified objects or locations. The mobile reader reads identifying information from the assets and inventory, while the tracking system determines and tracks the physical location of the mobile reader. As the mobile reader records the identifying information, or related data, from items placed on or embedded in the item being scanned by the mobile reader (barcode labels for example), the data is then transmitted back to the tracking system, along with the relevant mobile reader information transmitted from the mobile reader to be used by the tracking system to determine scanner location.

The principles apply to any item, object, or article (e.g., game pieces, clothing, automobiles, etc.) that contains a unique identifier readable with a mobile reader and in any environment where receiver antennae are available to receive the RF signals emitted by the mobile reader. Further, data at unique locations may be recorded, with the recorded data becoming associated with the location where the reader determined, measured, or calculated the data.

All examples and features mentioned below can be combined in any technically possible way.

In one aspect, a tracking system comprises a mobile device that records item data from a data source identified with an item and wirelessly transmits this item data in a radio frequency (RF) signal. A radio receiver network includes at least two receiver antennae that receive the RF signal transmitted by the mobile device. A comparator circuit is configured to determine a timing difference between the RF signal received by one of the at least two receiver antennae and the RF signal received by another of the at least two receiver antennae. A central processing unit is in communication with the comparator circuit to acquire the timing difference and to calculate therefrom a physical location of the item. The central processing unit further identifies the item based on the item data transmitted from the mobile device and associating the identified item with the determined physical location of the item.

In another aspect, a tracking system comprises a mobile device that records item data from a data source identified with an item and wirelessly transmits this item data in a radio frequency (RF) signal. A radio receiver network includes at least two receiver antennae that receive the RF signal transmitted by the mobile device. A comparator circuit is configured to determine a timing difference between the RF signal received by one of the at least two receiver antennae and the RF signal received by another of the at least two receiver antennae. A central processing unit is in communication with the comparator circuit to acquire the timing difference and to calculate therefrom a physical location of the item. The central processing unit further identifies the item based on the item data transmitted from the mobile device and associates the identified item with the determined physical location of the item.

In yet another aspect, a system for tracking mobile RF transmitters comprises at least one mobile radio transmitter that transmits data captured at a physical location in an RF signal, at least two radio receiver networks, and at least two central processing units. Each radio receiver network includes at least two receiver antennae and a data processing unit. Each central processing unit is in communication with the data processing unit of one of the radio receiver networks to receive the time difference calculated by that data processing unit and compute therefrom a distance of the at least one RF transmitter from the at least two receiver antennae of that one radio receiver networks, thereby determining a position of the at least one RF transmitter to be associated with the captured data. A master processor is in communication with the at least two central processing units to coordinate tracking of the at least one RF transmitter as the at least one RF transmitter moves through an area of coverage by the at least two radio receiver networks.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1:
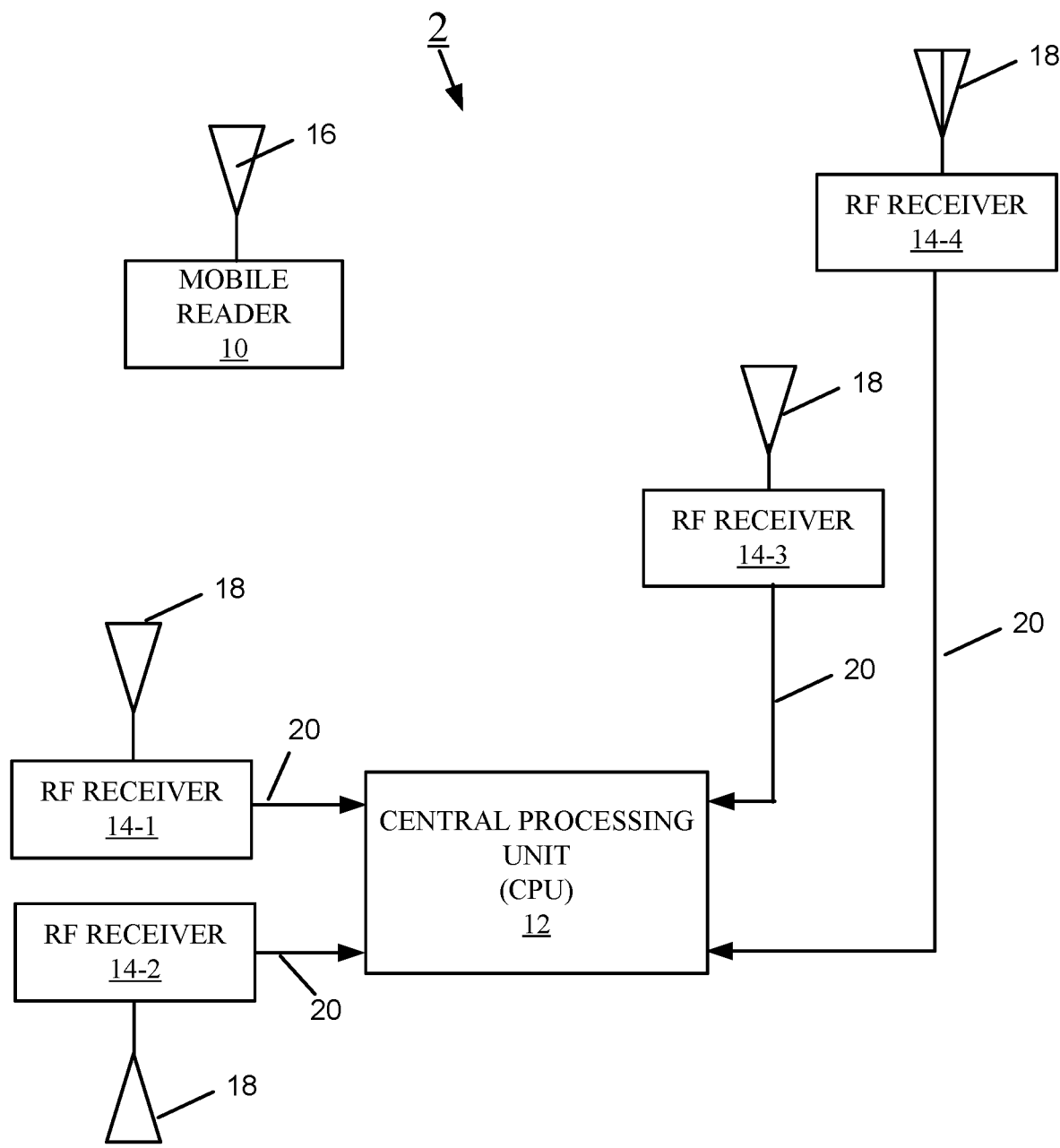
FIG. 1 is an overview of an example of mobile reader operation.

FIG. 1 shows an embodiment of a tracking system 2 including a mobile reader 10, a central processing unit (CPU) 12, and a plurality of RF receivers 14-1, 14-2, 14-3, and 14-4 (generally, receiver 14).

In one embodiment, the mobile reader 10 is a handheld device used to read identifier information (e.g., a barcode) and other related data from assets or inventory using a basic scanning technique. The mobile reader 10 may be a device dedicated to reading the identifier, an example of which is a handheld barcode scanner, or be a device with multiple functions, such as a handheld computer, smart phone, or augmented reality glasses. The method used by the mobile reader 10 to read identifier information can be any one of a number of different optical or wireless data reading technologies including, but not limited to, passive transponder tags, optical tags, and active transceivers.

In another embodiment, the mobile reader 10 is a device capable of capturing information associated with a physical location. For example, the mobile reader 10 can have a sensor for detecting a condition of the environment where the mobile reader is located, examples of such sensors include, but are not limited to, temperature, humidity, chemical, gas, or other sensors. While the mobile reader may be handheld, it may be mounted on an attachment to the body (i.e., a glove type device) or as part of glasses (such as the antenna and scanner being integrated into augmented reality glasses). In any configuration, the antenna, scanner, battery and processing circuitry may be co-located or physically separated (i.e., the scanner and antenna are mounted on augmented reality glasses while the battery and processor are mounted on the user's body, for example, on a belt). The mobile reader 10 may be also referred to herein as a mobile device or mobile scanner.

The mobile reader 10 includes a transmitter (not shown) that transmits an electromagnetic signal (microwave, radio frequency) from an antenna 16. In one embodiment, the RF signal conforms to an 802.11 wireless Local Area Network (LAN) type protocol. In addition, the principles described herein extend to other RF protocols including, but not limited to, Bluetooth and ZigBee. System tradeoffs mean that frequency choice affects antenna size and that very high frequency systems result in signal propagation limitations. Provided the phase of the signal can be calculated or the time of arrival can be measured by either phase comparison at the mobile reader or single receiver antenna or through a synchronized two-way communication between the mobile reader and the receiver antenna, various protocols and signal wavelengths may be utilized including but not limited to Bluetooth, Wi-Fi, ultra wideband, and other frequency RF carrier signals. FSK, BPSK, QPSK or any other modulation scheme that provides phase information may be utilized.

In one embodiment, each of the receivers 14 includes at least one antenna 18, a band pass filter (not shown) and a low noise amplifier (LNA) (not shown). The antennae 18 are disposed near or around the mobile reader 10. The receivers 14 form a receiver network, and the mobile reader 10 works within the physical receiver network (i.e., within range of the receivers 14). The position (X, Y, Z) of each receiver antenna 18 is known; the coordinates of each phase center of the one or more antennae 18 of each receiver 14 are predetermined and used as coordinate reference for correlating the coordinate location of the mobile reader 10 within the receiver network. Also, the phase center of the one or more antennae 16 of the mobile reader 10 is used as a reference for the coordinates of the mobile reader 10. Although four receivers 14 are shown, the principles described herein can be practiced by as few as two receivers 14. Furthermore, a variety of filters, amplifiers or other receiver circuitry may be utilized to receive electromagnetic signals.

The central processing unit 12 is in communication with each of the receivers 14 over communication links 20. Such communication links 20 can be wired (e.g., cables) or wireless.

In brief overview, during operation of the mobile reader tracking system 2, the mobile reader 10 reads the identifier information (e.g., barcode) from an item, either recorded on a label or embedded into the item, to determine the identification (ID) of the identifier and optionally, other relevant data. After recording the identifier information and/or relevant data, the mobile reader 10 sends an electromagnetic signal to the tracking system 2. The electromagnetic signal carries the identifier information and relevant data, if any, of the item. Each of the receivers 14 in range of the mobile reader 10 receives the electromagnetic signal and sends the electromagnetic signal (possibly filtered and amplified) to the central processing unit 12. The central processing unit 12 records the identifier information and relevant data (if any) and determines the two- or three-dimensional location of the mobile reader 10.

Figure 2:
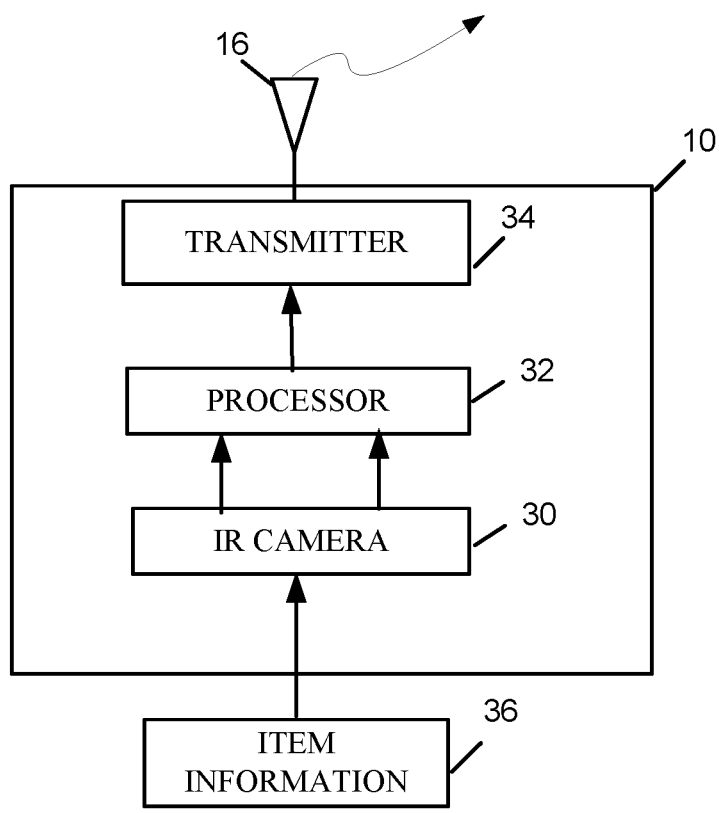
FIG. 2 is a block diagram of an embodiment of a mobile radio scanner or reader.

FIG. 2 shows an embodiment of the mobile reader 10 including an infrared camera 30, a processor 32, and a transmitter 34 coupled to the antenna 16. The infrared camera 30 is configured to capture an image of the identifier information 36 from an item. The processor 30 is configured to read and record the identifier information 36 captured by the camera 30 and to activate the transmitter 34. The transmitter 34 is configured to send the identifier information and relevant signal timing data by the transmitter antenna 16.

The mobile reader 10 may capture a variety of data associated with an item. Examples of other relevant data that may be read include product identifier (including, but not limited to, a barcode), spoilage information, temperature, functional description or any other information that the mobile reader 10 may capture, derive or decode. As an example, the mobile reader 10 can capture a picture of the item for identification purposes, and that image data would be sent by the mobile reader 10 with signals enabling position determination and/or tracking. Alternatively, or in addition, the user can manually input data associated with an item, and when the user sends this information to the central processing unit 12, the location of the mobile reader 10 is determined at the tracking system and that location is associated with the entered data.

In an alternate embodiment, the mobile reader 10 may capture information associated with a location rather than an item. For example, the mobile reader 10 may have a sensor to measure temperature; each time a temperature measurement is taken the mobile reader 10 transmits an RF signal containing the captured data to the tracking system 2 along with RF signals adequate to determine the position of the mobile reader 10 (described in connection with FIG. 3). The central processing unit 12 in the tracking system 2 records the data and location where the data was captured. In this manner, for example, a robot or drone can move through a facility and capture information (temperature, humidity, light or other data) that can be associated with locations throughout a facility.

Figure 3:
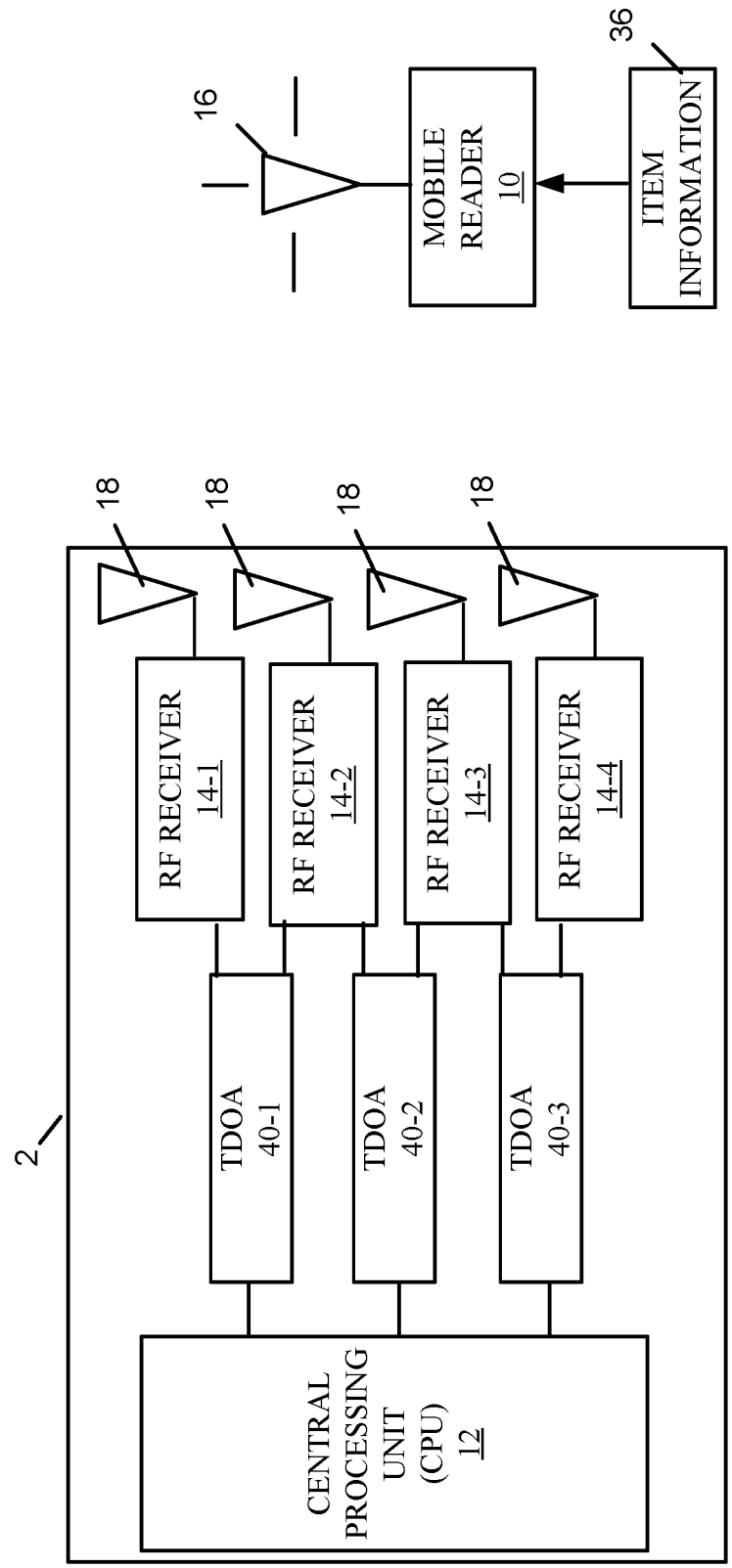
FIG. 3 shows an overview of the scanner tracking system operation.

FIG. 3 shows an embodiment of the tracking system 2 including the four RF receivers 14-1, 14-2, 14-3, and 14-4 and their receiver antennae 18, three time difference of arrival circuits (TDOA) 40-1, 40-2, 40-3 (generally, TDOA or comparator circuit 40), the central processing unit 12 for recording item data and reader location data. Also shown, the mobile reader 10 reads the item information 36 and sends the relevant data to the tracking system 2.

In this system 2, the mobile reader 10 records ID, relevant data or both from a barcode label, for example, placed on a piece of inventory. As or after reading the barcode label, the mobile reader 10 transmits a radio signal to the network of receivers 14 (or receiver antennae 18) placed around a facility, for example, a warehouse, factory, store, supermarket, or mall. As the radio signal from the mobile reader 10 arrives at each receiver 14 (or receiver antenna 18), the tracking system 2 processes the signal to record the identifier information, relevant data, or both of the item, and uses the radio signal transmitted by the mobile reader 10 to determine the location of the mobile reader 10. The CPU 12 performs the item data recording and the scanner location recovery.

In one embodiment, the location of the signal transmitter 16 located in the mobile reader 10 is calculated based on the timing difference between receipt of the radio signal at each antenna (specifically TDOA). An example of a method for tracking an RF transmitter using phase differences at multiple receivers in order to identify the position of the transmitter is described in U.S. Pat. No. 8,749,433, granted Jun. 10, 2014, titled "Multiplexing Receiver System", the entirety of which is incorporated by reference herein. Other techniques for tracking the signal transmitter 16 in mobile reader 10 may be utilized.

More specifically, each receiver 14 may receive the same signal, but the phase difference between each signal represents the distance the signal travelled from the transmitter to the known position of the antennas. This allows a distance calculation from each receiver 14 to the transmitter 16 and with four antennae 18 permits position locating and tracking (because the location of each antenna in receiver 14 is known). FSK, BPSK, QPSK or any other modulation scheme that provides phase information can be utilized.

In one embodiment, the item (or location) identifier and/or data may be transmitted upon activation of the mobile reader 10 collecting data. Further, to conserve battery power in the mobile reader 10, the RF signal may be transmitted over a short period of time or intermittently. If battery power is not a concern, the RF transmitter 16 in the mobile reader 10 may continuously transmit RF signals to permit continuous tracking of the mobile reader 10, with storage of that track possible in conjunction with storage of captured data.

In one embodiment, a stock person may scan product with the mobile reader 10 as the person places the product on a shelf. The act of scanning the product barcode, for example, can cause storage of the product identity and location by the central processing unit 12. An asset manager, customer, or other party, can then know exactly where the product was placed as the identifying information and location of the product are communicated to them from the central processing unit 12.

Figure 4:
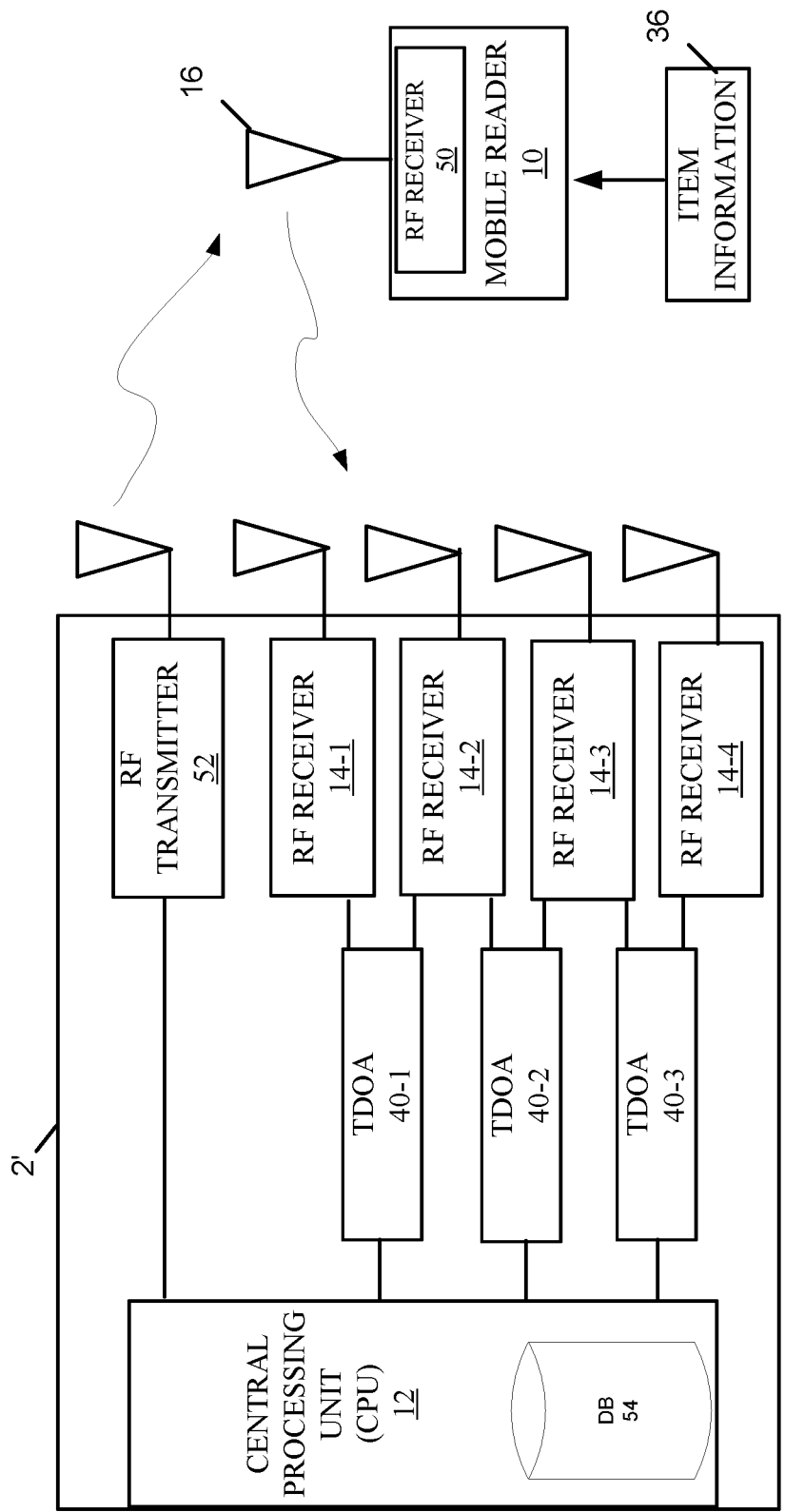
FIG. 4 shows a block diagram of an example of a two-way communication system of the mobile reader tracking system.

FIG. 4 shows an embodiment of the tracking system 2' configured for two-way communication between the mobile reader 10 and the network of receivers 14. In this embodiment, the mobile reader 10 includes a receiver 50, the network of receivers 14 includes at least one transmitter 52, and the central processing unit 12 includes memory for storing a database (DB) 54. Although shown separate from the receivers 14, the at least one transmitter 52 can be implemented with one or more of the receivers 14. With the mobile device 10 and the receiver network associated with the central processing unit being capable of transmitting and receiving RF signals, bidirectional communication is possible.

In this embodiment, the central processing unit 12 can use the database 54 to correlate data and locations. The database 54 may be created before any use of the mobile reader 10 by populating, for example, product identification data with associated physical locations. For example, a person could identify various locations in a warehouse, and then associate items or products that are to be stored at those locations in the warehouse. Barcode data identifying a product can be paired with an expected location for various products. Alternatively, the database 54 can be populated in part or in whole by using the mobile reader 10 to read item or product data. The central processing unit 12 can store the item identifier information and tracked location in the database 54, and identify the stored product item identifier information and location as the "standard" or correct location for the product. In this embodiment, the database 54 is populated in a "learn mode".

After the database 54 contains the identifier information and location expected for the items or products, the central processing unit 12 can compare later captured item (or location data) and identified position with the expected data and location for that item stored in the central processing unit 12. For example, when a stockperson scans a product barcode, the central processing unit 12 can also determine the location of the mobile reader 10, as described above, thereby determining product identification and location. The central processing unit 12 can then compare the actual stocking location to a stored stocking location in the database 54 (i.e., do the product identifier and location obtained from the scan match the expected location for that product as stored in central processing unit 12?).

In such a system, the transmitter 52 can provide information about the match back to the mobile reader 10 through the receiver 50 of the mobile reader 10. For example, after the central processing unit 12 compares the captured data and location to the stored data and location, a signal may be sent from the central processing unit 12 through the transmitter 52 to the receiver 50 in the mobile reader 10 to inform the stockperson (or other individual) by cue (visual, auditory, or both) that the product has been correctly stocked or had been misplaced.

Upon matching the product identifier location and tracked location with the stored expected location and identifier, an acknowledgment signal can be transmitted by the tracking system 2 to the mobile reader 10. Alternatively, if either the captured product data or location do not match the stored location for that item, the tracking system 2 can send a signal to the mobile reader 10 indicating a problem or prohibiting further data capture.

Further, if the central processing unit 12 has stored the expected location for the scanned item, the correct location for the identified item may be transmitted to the mobile reader 10. As an example, a stockperson trying to stock an item in the wrong location, or finding an item misplaced, may scan the item causing the item identification data and location to be sent to the central processing unit 12. The central processing unit 12 can determine that the captured item data and location do not match the stored item identification and location. If the central processing unit 12 has stored the correct location of the misplaced item stored, the tracking system 2 can direct the stockperson to the proper stocking location.

The identifier information, relevant data, and position location information stored by the central processing unit 12 may be stored in various types of memory devices (including but not limited to, DRAM, SRAM, hard drive or other electronic data storage devices). Further, when referring to the central processing unit 12 accessing information stored "in" the central processing unit 12, the information may be physically stored in the central processing unit 12 or may be stored in another physical location and sent to the central processing unit (i.e., a separate memory device, server or the cloud) within the scope of this invention.

Optionally, the RF signal from the mobile reader 10 containing the captured data (and the location, if desired) may be transmitted repeatedly until an acknowledgement is received by the mobile reader 10 from the central processing unit 12, at which point the mobile reader 10 may stop transmitting to preserve power. Similarly, the mobile reader 10 may stop transmitting RF signals that permit position tracking if no reading or scanning is performed for a predetermined amount of time.

In another embodiment, a user playing a game can find an item or object and capture identifying data from it. If the location of the object matches the predicted location for that object stored in the central processing unit 12, the game can reward the player with, for example, points, information. Further, other users may be allowed to see the location of the found item and thereby track the item and the player that found the item.

In another embodiment, a user can identify an item presenting an issue, problem, or opportunity. The user can identify a tag on the object, place a tag on an item and scan the tag (or input tag information into the mobile reader 10 manually), or take a photograph of the item. Other methods may be used to input identification data into the mobile reader 10.

In one embodiment, a homeowner can walk through a house with a mobile reader, intending to create a checklist of things that need repair. The homeowner may find, for example, a power outlet that is nonfunctional. The homeowner can take a photograph of the faulty outlet with the mobile transmitter 34 (FIG. 2). The image data and location of the mobile reader 10, as indicated at image capture, are communicated through the network of receivers 14 and stored at the central processing unit 12, as described above.

Alternatively, instead of capturing an image, the user can put an identifier tag on the faulty outlet and scan a tag (for example, a barcode). In another embodiment, the homeowner can physically input (through a keyboard, touchscreen, or the like) identifying data (i.e., indication that a repair needs to be made) using the data entry on the mobile reader 10. In these examples, the image or tag may be considered a "virtual sticky" placed on the virtual location of the power outlet in the memory associated with the central processing unit 12. The data (i.e., "an issue is here") and the location of the data are thus transmitted and stored at the central processing unit 12.

When the builder or repair person walks into the house with access to the data (image and location) stored in the central processing unit 12, they can identify the location of the faulty outlet based on the data stored in the central processing unit 12. In one embodiment, after repairing the issue, the repair person may take a photograph of the faulty outlet and the image data and location of the mobile reader 10 is communicated to the central processing unit 12. This update may cause removal of the faulty outlet as needing repair in the central processing unit 12—thus, removing the virtual sticky. Similar to that described above, the virtual sticky may be removed by physical input of data to the mobile reader 10 and sending data and position location to the central processing unit 12.

Figure 5:
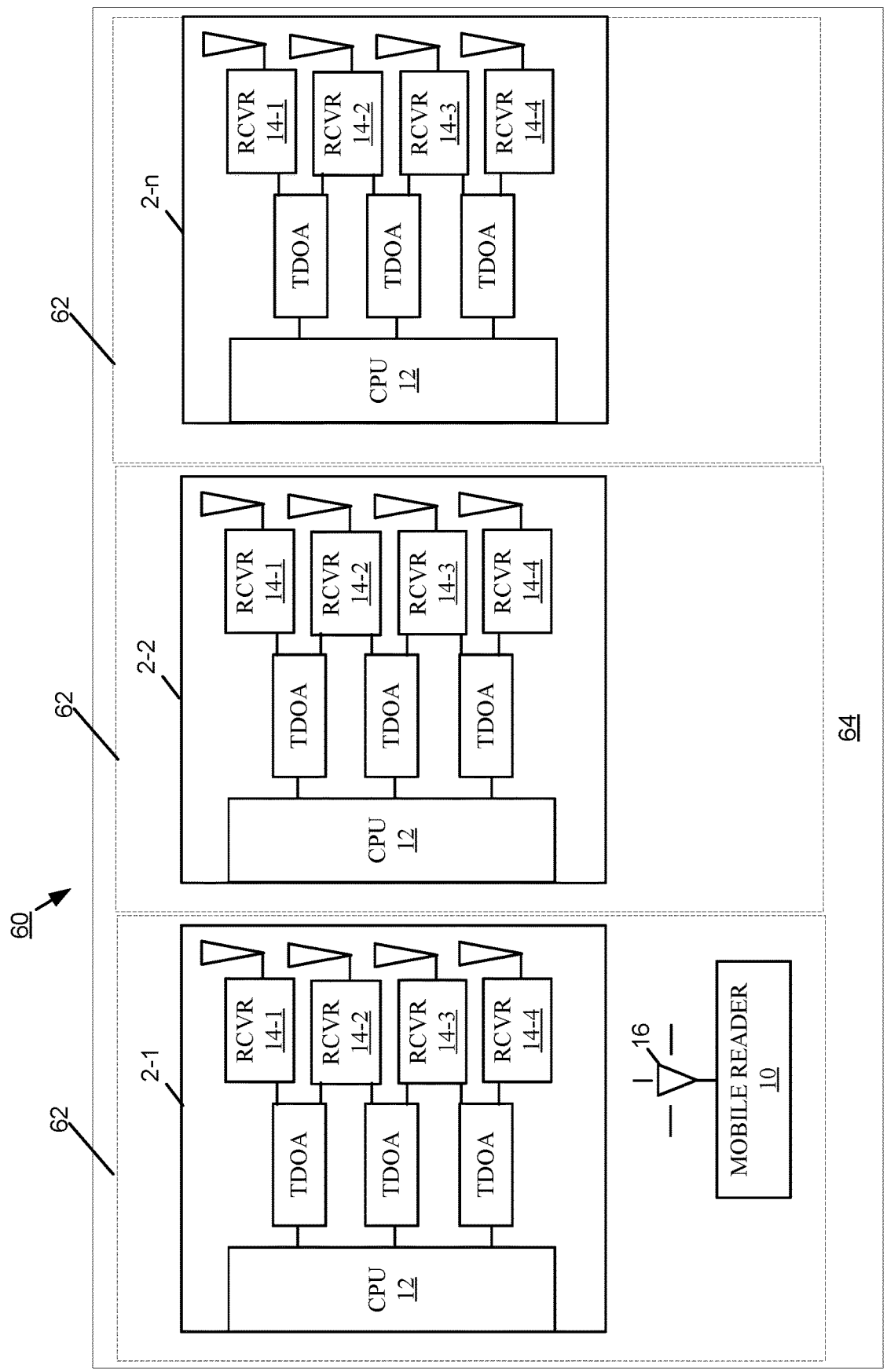
FIG. 5 shows an example of the mobile reader tracking system configured into multiple cells to expand coverage area.

FIG. 5 shows an embodiment of a type of cellular system 60 for tracking items across a larger geographic region 64. The cellular system 60 comprises a plurality of mobile reader position tracking systems 2-1, 2-2, ... 2-n (generally, tracking system 2), as shown and described in connection with FIG. 3. Each tracking system 2 covers one cell 62 of the cellular system 60. Neighboring cells are physically located adjacent to each other. Each cell has a central processing unit 12, TDOA circuits 40, and a network of receivers 14 (and antennae) that track an RF transmitter if the mobile reader is located and moves through the antenna area of coverage. Such a system 60 can hand off the transmitter as the mobile reader 10 passes from one area of coverage (or cell) to the next.

In one embodiment, a central processing unit 12 of one of the cells 62 is a master processor and the other central processing units 12 of the other cells 62 are slave processors. The master processor may track items thru cells. Although three cells 62 are shown, the area of coverage may be extended by adding additional cells 62. Further, the master processor may not be a central processing unit that tracks a transmitter directly, but may receive captured data and position information from multiple central processing units to track multiple objects, items, and data in the regions of coverage.

As will be appreciated by one skilled in the art, aspects of the present invention may be embodied as a system, method, and computer program product. Thus, aspects of the present invention may be embodied entirely in hardware, entirely in software (including, but not limited to, firmware, program code, resident software, microcode), or in a combination of hardware and software. Such embodiments may generally be referred to herein as a circuit, a module, or a system. In addition, aspects of the present invention may be in the form of a computer program product embodied in one or more computer readable media having computer readable program code embodied thereon.

Any combination of one or more computer readable medium(s) may be utilized. The computer readable medium may be a computer readable signal medium or a computer readable storage medium. The computer readable medium may be a non-transitory computer readable storage medium, examples of which include, but are not limited to, an electronic, magnetic, optical, electromagnetic, infrared, or semiconductor system, apparatus, or device, or any suitable combination thereof.

As used herein, a computer readable storage medium may be any tangible medium that can contain or store a program for use by or in connection with an instruction execution system, apparatus, device, computer, computing system, computer system, or any programmable machine or device that inputs, processes, and outputs instructions, commands, or data. A non-exhaustive list of specific examples of a computer readable storage medium include an electrical connection having one or more wires, a portable computer diskette, a floppy disk, a hard disk, a random access memory (RAM), a read-only memory (ROM), a USB flash drive, an non-volatile RAM (NVRAM or NOVRAM), an erasable programmable read-only memory (EPROM or Flash memory), a flash memory card, an electrically erasable programmable read-only memory (EEPROM), an optical fiber, a portable compact disc read-only memory (CD-ROM), a DVD-ROM, an optical storage device, a magnetic storage device, or any suitable combination thereof.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. As used herein, a computer readable storage medium is not a computer readable propagating signal medium or a propagated signal.

Program code may be embodied as computer-readable instructions stored on or in a computer readable storage medium as, for example, source code, object code, interpretive code, executable code, or combinations thereof. Any standard or proprietary, programming or interpretive language can be used to produce the computer-executable instructions. Examples of such languages include C, C++, Pascal, JAVA, BASIC, Smalltalk, Visual Basic, and Visual C++.

Transmission of program code embodied on a computer readable medium can occur using any appropriate medium including, but not limited to, wireless, wired, optical fiber cable, microwave or radio frequency (RF), or any suitable combination thereof.

The program code may execute entirely on a user's device, partly on the user's device, as a stand-alone software package, partly on the user's device and partly on a remote computer or entirely on a remote computer or server. Any such remote computer may be connected to the user's device through any type of network, including a local area network (LAN) or a wide area network (WAN), or the connection may be made to an external computer (for example, through the Internet using an Internet Service Provider).

Additionally, methods of this invention can be implemented on a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, or the like. In general, any device capable of implementing a state machine that is in turn capable of implementing the proposed methods herein can be used to implement the principles of this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or a VLSI design. Whether software or hardware is used to implement the systems in accordance with this invention is dependent on the speed and/or efficiency requirements of the system, the particular function, and the particular software or hardware systems or microprocessor or microcomputer systems being utilized.

While the aforementioned principles have been described in conjunction with a number of embodiments, it is evident that many alternatives, modifications and variations would be or are apparent to those of ordinary skill in the applicable arts. Accordingly, it is intended to embrace all such alternatives, modifications, equivalents, and variations that are within the spirit and scope of this invention.

What is claimed is:

1. A method of determining a physical location of an item, the method comprising the steps of:
    scanning, using a mobile reader that is handheld, worn by a person, or attached to or part of a vehicle, a data source to acquire therefrom data associated with the item;
    transmitting, by the mobile reader from a physical location where the mobile reader scanned the data source, a radiofrequency (RF) signal that conveys the acquired data associated with the item;
    receiving the RF signal by at least two receiver antennae;
    determining a timing difference between the RF signal received by one of the at least two receiver antennae and the RF signal received by another of the at least two receiver antennae;
    calculating based on the timing difference the physical location from which where the mobile reader transmitted the RF signal;
    identifying the item based on the data transmitted by the mobile reader in the RF signal; and
    associating a calculated physical location from where the mobile reader scanned the data source and the calculated physical location from where the mobile reader transmitted the data identifying the item in the RF signal.

2. The method of claim 1, wherein the data source is physically attached to or embedded in the item.

3. The method of claim 1, wherein the data source is a machine-readable code.

4. The method of claim 1, wherein the step of scanning the data source includes the step of capturing an image using a camera of the mobile device in order to acquire the data associated with the item.

5. The method of claim 1, wherein the data source includes a transponder tag, and wherein the step of scanning the data source includes:
    wirelessly transmitting a signal that activates the transponder tag; and
    receiving the data associated with the item in a transmission sent by the transponder tag in response to the activating signal.

6. The method of claim 1, further comprising the step of transmitting to the mobile reader an RF signal indicating whether the calculated physical location associated with the identified item matches an expected physical location for the identified item.

7. The method of claim 1, further comprising the step of transmitting to the mobile reader an RF signal indicating whether the identified item associated with the calculated physical location matches an expected item associated with that calculated physical location.

8. The method of claim 1, wherein a pair of augmented reality glasses comprises the mobile reader.

9. The method of claim 1, wherein a glove comprises the mobile reader.

10. The method of claim 1, wherein the data source is a label.

11. A method of associating acquired data with a physical location, the method comprising the steps of:
    acquiring, by a sensor of a mobile device disposed at a physical location, data from an information source external to the mobile device;

transmitting, by the mobile device from the physical location, the acquired data in a radiofrequency (RF) signal;

receiving, by at least two receiver antennae, the RF signal transmitted by the mobile device;

calculating the physical location from which the mobile device transmitted the RF signal based on a timing difference measured from when one of the at least two receiver antennae received the RF signal and another of the at least two receiver antennae received the RF signal; and associating the acquired data in the RF signal with a calculated physical location from where the mobile reader acquired the data from the information source and with the calculated physical location from where the mobile reader transmitted the acquired data in the RF signal.

12. The method of claim 11, wherein the step of acquiring, by a sensor of a mobile device disposed at a physical location, data from an information source external to the mobile device includes the step of measuring an environmental condition, and wherein the acquired data are the environmental condition measurement.

13. The method of claim 11, wherein the step of transmitting, by the mobile device, the acquired data in a radiofrequency (RF) signal occurs continuously until the mobile device receives an acknowledgment signal.

14. The method of claim 11, further comprising the step of transmitting to the mobile reader an RF signal indicating whether the calculated physical location associated with the acquired data matches an expected physical location for that acquired data.

15. The method of claim 11, further comprising the step of transmitting to the mobile reader an RF signal indicating whether the acquired data associated with the calculated physical location matches expected acquired data associated with that calculated physical location.

16. The method of claim 11, wherein the sensor of the mobile device comprises an optical sensor for obtaining the data from the information source through image capture.

17. The method of claim 11, wherein the mobile device is attached to an article worn by a user.

18. The method of claim 11, wherein the mobile device is a handheld device.

19. The method of claim 11, wherein the mobile device is attached to or part of a vehicle.

20. The method of claim 11, wherein the mobile device is a barcode scanner.

21. The method of claim 11, wherein the mobile device is a drone.

22. A method of determining a physical location of an item, the method comprising the steps of:

scanning, using a mobile reader that is handheld, worn by a person, or attached to or part of a vehicle, a data source to acquire therefrom data associated with the item;

transmitting, by the mobile reader from a physical location where the mobile reader scanned the data source, a radiofrequency (RF) signal that conveys the acquired data associated with the item;

receiving the RF signal by two or three receiver antennae;

measuring a time of arrival between the mobile reader and the two or three receiver antennae;

identifying the item based on the data transmitted by the mobile reader in the RF signal; and associating a calculated physical location from where the mobile reader scanned the data source and the calculated physical location from where the mobile reader transmitted the data identifying the item in the RF signal.

23. The method of claim 22, wherein the time of arrival is measured by either a phase comparison at the mobile reader or at least one antenna of the two or three receiver antennae or through a synchronized two-way communication between the mobile reader and the at least one antenna.

\* \* \* \* \*